United States Patent
Ihala Gamaralalage et al.

(10) Patent No.: US 11,370,988 B2
(45) Date of Patent: Jun. 28, 2022

(54) METAL NANOPARTICLES AS LUBRICANT ADDITIVES

(71) Applicant: UT-Battelle, LLC, Oak Ridge, TN (US)

(72) Inventors: Chanaka Kapila Kumara Ihala Gamaralalage, Oak Ridge, TN (US); Jun Qu, Oak Ridge, TN (US)

(73) Assignees: UT-Battelle, LLC, Oak Ridge, TN (US); University of Tennessee Research Foundation, Knoxville, TN (US)

(*) Notice: Subject to any disclaimer, the term of this patent is extended or adjusted under 35 U.S.C. 154(b) by 44 days.

(21) Appl. No.: 16/412,548

(22) Filed: May 15, 2019

(65) Prior Publication Data
US 2019/0352574 A1 Nov. 21, 2019

Related U.S. Application Data

(60) Provisional application No. 62/671,482, filed on May 15, 2018.

(51) Int. Cl.
*C10M 125/00* (2006.01)
*C10M 125/04* (2006.01)
(Continued)

(52) U.S. Cl.
CPC ........ *C10M 125/04* (2013.01); *C10M 177/00* (2013.01); *B82Y 30/00* (2013.01); *C10M 2201/06* (2013.01); *C10M 2215/02* (2013.01); *C10M 2219/08* (2013.01); *C10N 2010/02* (2013.01); *C10N 2010/14* (2013.01);
(Continued)

(58) Field of Classification Search
CPC .............. C10M 125/04; C10M 177/00; C10M 2201/06; C10M 2215/02; C10M 2219/08; C10M 2215/04; C10M 2201/05; C10N 2010/02; C10N 2010/14; C10N 2020/06; C10N 2020/061; C10N 2030/06; C10N 2030/12; C10N 2060/09; C10N 2060/10;
(Continued)

(56) References Cited

U.S. PATENT DOCUMENTS 8,268,760 B2  9/2012 Habeeb et al.
8,455,407 B2  6/2013 Schmidt-Amelunxen et al.
(Continued)

OTHER PUBLICATIONS

J.C. Sanchez-Lopez et al. (Surface-modified Pd and Au nanoparticles for antiwear applications) (Year: 2009).*
(Continued)

*Primary Examiner* — Taiwo Oladapo
(74) *Attorney, Agent, or Firm* — Scully, Scott, Murphy & Presser, P.C.

(57) ABSTRACT

A lubricant composition comprising: (i) silver or gold nanoparticles, each of which is encapsulated by a layer of alkylthiol or alkylamine molecules; (ii) palladium or platinum nanoparticles, each of which is encapsulated by a layer of alkylthiol or alkylamine molecules; and (iii) a fluid in which components (i) and (ii) are present. Further described are methods for applying the lubricant composition onto a mechanical device for which lubrication is beneficial, with resulting improvement in friction and wear reduction and/or corrosion inhibition.

28 Claims, 10 Drawing Sheets

(51) Int. Cl.
*C10M 177/00* (2006.01)
*B82Y 30/00* (2011.01)
*C10N 10/02* (2006.01)
*C10N 10/14* (2006.01)
*C10N 20/06* (2006.01)
*C10N 20/00* (2006.01)
*C10N 30/06* (2006.01)
*C10N 30/12* (2006.01)
*C10N 60/00* (2006.01)
*C10N 60/10* (2006.01)
*C10N 10/16* (2006.01)

(52) U.S. Cl.
CPC ...... *C10N 2010/16* (2013.01); *C10N 2020/06* (2013.01); *C10N 2020/061* (2020.05); *C10N 2030/06* (2013.01); *C10N 2030/12* (2013.01); *C10N 2060/09* (2020.05); *C10N 2060/10* (2013.01)

(58) Field of Classification Search
CPC .......... C10N 2040/02; C10N 2050/015; C10N 2050/02; B82Y 30/00
See application file for complete search history.

(56) References Cited

U.S. PATENT DOCUMENTS 9,957,460 B2    5/2018  Qu et al.
2010/0227189 A1  9/2010  Shumaker-Parry et al.

OTHER PUBLICATIONS

Chanaka Kumara et al., Organic-Modified Silver Nanoparticles as Lubricant Additives, ACS Appl. Mater. Interfaces 2017, 37227-37237 (Year: 2017).*

Ghaednia, H., et al. "The effect of nanoparticles on thin film elasto-hydrodynamic lubrication." Appl. Phys. Lett. 2013, 103 (26), 263111.

Zhou, J., et al. "Tribological behavior and lubricating mechanism of Cu nanoparticles in oil." Tribol. Lett. 2000, 8 (4), 213-218.

Zhang, M., et al. "Performance and anti-wear mechanism of Cu nanoparticles as lubricating oil additives." Ind. Lubr. Tribol. 2009, 61 (6), 311-318.

Yu, H.-l., et al. "Tribological properties and lubricating mechanisms of Cu nano-particles in lubricant." Trans. Nonferrous Met. Soc. China 2008, 18 (3), 636-641.

Zhang, W., et al. "Fundamental understanding of the tribological and thermal behavior of Ag—MoS2 nanoparticle-based multi-component lubricating system." Wear 2012, 288, 9-16.

Viesca, J.L., et al. "Antiwear properties of carbon-coated copper nano-particles used as an additive to a polyalphaolefin." Tribol. Int. 2011, 44 (7), 829-833.

Meng, Y., et al. "Supercritical Fluid Synthesis and Tribological Applications of Silver Nanoparticle-decorated Graphene in Engine Oil Nanofluid", Sci. Rep. 2016, 610.1038/ srep31246.

Sańchez-López, J.C., et al. "Surface-modified Pd and Au nanoparticles for anti-wear applications." Tribol. Int. 2011, 44 (6), 720-726.

Kolodziejczyk, L., et al. "Surface-modified Pd nanoparticles as a superior additive for lubrication." J. Nanopart. Res. 2007, 9 (4), 639-645.

C. Kumara et al., "ACS Applied Materials & Interfaces", 9(42), 37227-37237, 2017.

C. Kumara et al., "ACS Applied Materials & Interfaces", 2018, 10(37), 31804-31812.

* cited by examiner

METAL NANOPARTICLES AS LUBRICANT ADDITIVES

CROSS REFERENCE TO RELATED APPLICATION

The present application claims benefit of U.S. Provisional Application No. 62/671,482, filed on May 15, 2018, all of the contents of which are incorporated herein by reference.

STATEMENT REGARDING FEDERALLY SPONSORED RESEARCH

This invention was made with government support under Prime Contract No. DE-AC05-00OR22725 awarded by the U.S. Department of Energy. The government has certain rights in the invention.

FIELD OF THE INVENTION

The present invention relates generally to the fields of lubricant additives, and more particularly, to metal nanoparticles as additives in lubricating oils, such as engine and motor oils.

BACKGROUND OF THE INVENTION

Although numerous and diverse lubricating compositions for reducing friction in metal-containing interacting components are known, many of these compositions fall short in providing the optimal level of lubrication necessary for maintaining a reduced level of friction over the long term, particularly for movable parts that serve a critical function and that require operation in harsh conditions. Moreover, for those compositions that provide an acceptable level of friction reduction, many do not provide an adequate level of wear rate reduction, which may be of the same or even greater importance than friction reduction. Hence, there would be an advantage in a lubricating composition that provides at least the friction reduction ability of those known in the art, as well as a significant wear reduction ability, particularly for movable interacting parts that serve a critical function and operate in rugged conditions.

SUMMARY OF THE INVENTION

In one aspect, the present disclosure is directed to a lubricant composition that advantageously provides not only a significant level of friction reduction, but also a significant reduction in wear volume and/or wear rate. Moreover, as an additional advantage, the lubricant composition is relatively low cost and straight-forward to make and use. More specifically, the lubricant composition includes the following components: (i) silver or gold nanoparticles, each of which is encapsulated by a layer of alkylthiol or alkylamine molecules; (ii) palladium or platinum nanoparticles, each of which is encapsulated by a layer of alkylthiol or alkylamine molecules; and (iii) a fluid in which components (i) and (ii) are present.

In another aspect, the present disclosure is directed to a method for reducing friction and/or wear in mechanical components designed for movement by applying (i.e., coating) the mechanical components with the above-described lubricant composition. The method results in reduced friction and wear in the mechanical components when the mechanical components are in movable contacting operation with each other. The mechanical component can be any mechanical part known in the art for which lubricity could be beneficial. The mechanical component is typically constructed of metal, and can be, for example, a bearing, piston, turbine, fan, gear, shaft, axle, linkage, pump, motor, rotary blade, or compressor, any one or more of which may be in a larger mechanical system, such as a combustion engine, hydraulic system, or metal cutting system. The mechanical component may also include a part that is not a permanent component, such as a part being processed (e.g., cut) by a permanent component (e.g., a blade).

BRIEF DESCRIPTION OF THE DRAWINGS

FIG. 1A, panel (1) shows UV-visible spectra of silver nanoparticles, palladium nanoparticles, and mixture of silver and palladium nanoparticles (1:1 by weight) with time at room temperature. FIG. 1A, panel (2) shows UV-visible spectra of silver nanoparticles, palladium nanoparticles, and mixture of silver and palladium nanoparticles (1:1 by weight) with time heated at 80° C. for 30 minutes. Optical spectra were measured in toluene solution. Spectra are offset vertically for clarity. FIG. 1B, panels (3)-(5) show the corresponding transmission electron microscopy (TEM) images for Ag NPs, Pd NPs, and Ag NPs+Pd NPs at room temperature. FIG. 1C, panels (3)-(5) show the corresponding transmission electron microscopy (TEM) images for Ag NPs, Pd NPs, and Ag NPs+Pd NPs heated at 80° C. for 30 minutes.

FIG. 2A shows a set of friction coefficient traces of PAO with 0.50 wt % Ag NP, PAO with 0.50 wt % Pd NP, PAO with 0.25 wt % Ag NP+0.25 wt % Pd NP, and PAO with 0.05 wt % Ag NP+0.05 wt % Pd NP. FIG. 2B is a graph plotting wear volumes of PAO with 0.50 wt % Ag NP, PAO with 0.50 wt % Pd NP, PAO with 0.25 wt % Ag NP+0.25 wt % Pd NP, and PAO with 0.05 wt % Ag NP+0.05 wt % Pd NP.

DETAILED DESCRIPTION OF THE INVENTION

Figure 1A:
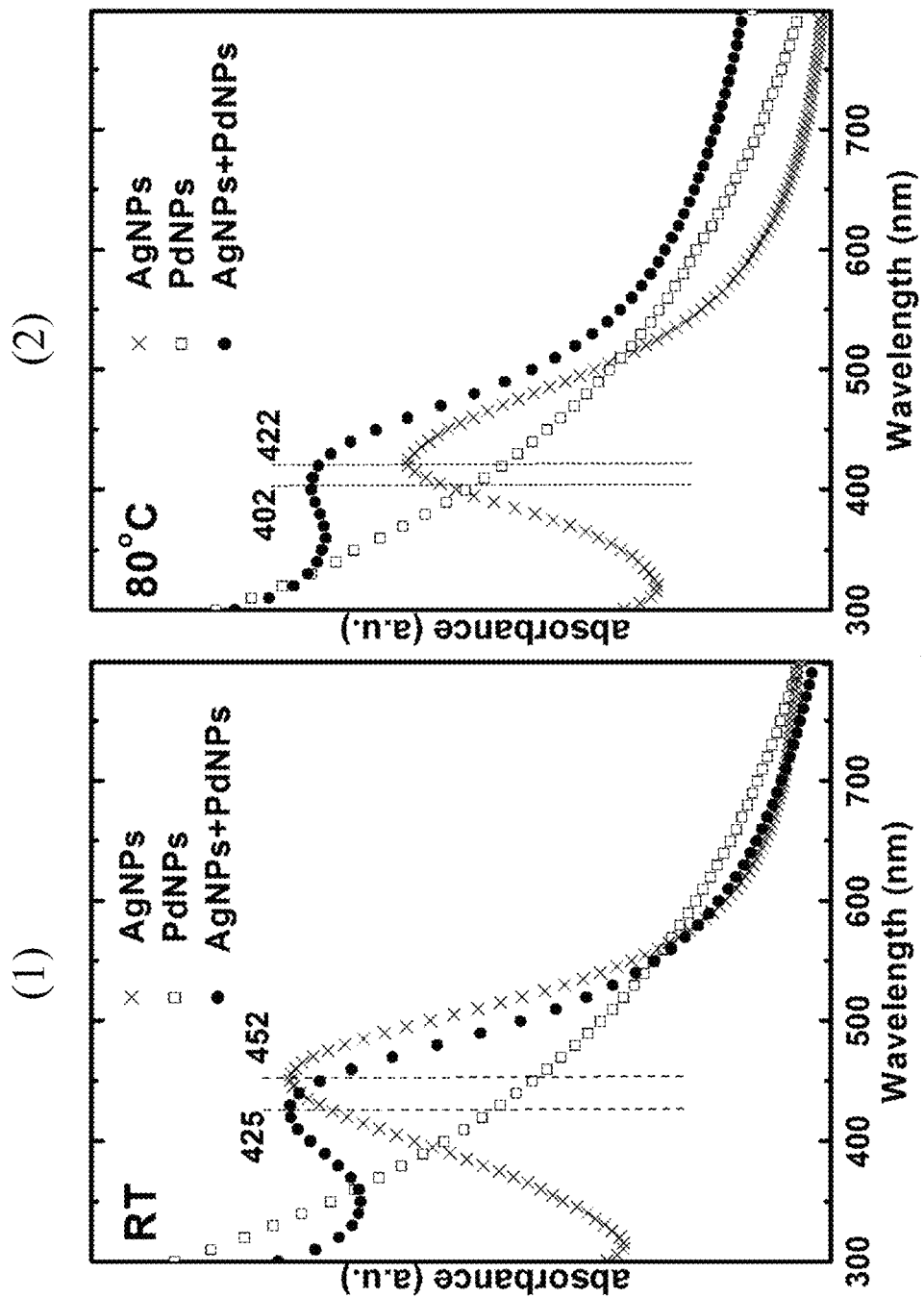
FIGS. 1A-1C show UV-visible spectra and morphology of the silver (Ag) and palladium (Pd) nanoparticles (NPs).

In one aspect, the invention is directed to a lubricant composition containing at least (or only) the following components: (i) silver or gold nanoparticles, each of which is encapsulated by a layer of alkylthiol or alkylamine molecules; (ii) palladium or platinum nanoparticles, each of which is encapsulated by a layer of alkylthiol or alkylamine molecules; and (iii) a fluid in which components (i) and (ii) are present. The term "present," as used herein in reference to the interaction of components (i) and/or (ii) with component (iii), indicates dissolution (i.e., solubilization) or suspension of components (i) and (ii) in component (iii). In some embodiments, components (i) and (ii) are at least partially or completely soluble in component (iii). In other embodiments, components (i) and (ii) are at least partially or completely suspended in component (iii).

Typically, components (i) and (ii) are present, in total, in an amount of at least 0.1 wt % in component (iii). In different embodiments, components (i) and (ii) are present in component (iii) in a total amount of precisely, about, or at least, for example, 0.1, 0.2, 0.3, 0.4, 0.5, 1, 1.2, 1.5, 1.8, or 2 wt %, or an amount within a range bounded by any two of the foregoing values (e.g., 0.1-2 wt % or 0.1-1.5 wt %, or 0.1-1 wt %). Although total amounts of components (i) and (ii) beyond 2 wt % (e.g., 2.5, 3, 4, or 5 wt % or above) may be used, such high amounts tend to be prohibitively expensive with no further benefit than lower amounts. Components (i) and (ii) may also be included in any suitable weight ratio with respect to each other. In different embodiments, components (i) and (ii) are present in a (i):(ii) weight ratio or (ii):(i) weight ratio of precisely or about, for example, 1:5, 1:4.5, 1:4, 1:3.5, 1:3, 1:2.5, 1:2, 1:1.5, or 1:1, or a weight ratio within a range bounded by any two of the foregoing ratios, such as precisely or about 5:1 to 1:1, or 1:1 to 1:5, or 5:1 to 1:5, or 4:1 to 1:4, or 3:1 to 1:3, or 2:1 to 1:2, or 1:1. As an example, components (i) and (ii) may be present in a total amount of about 0.1 wt % and in a ratio of 1:1, in which case components (i) and (ii) are each present in an amount of about 0.05 wt %. As another example, components (i) and (ii) may be present in a total amount of about 0.5 wt % and in a ratio of 1:1, in which case components (i) and (ii) are each present in an amount of about 0.25 wt %. As used herein, the term "about" generally indicates within ±20%, 10%, 5%, or 1% of the indicated value. For example, the term "about 1 wt %" generally indicates, in its broadest sense, 1 wt %±20%, which indicates 0.8-1.2 wt %. The term "about" may alternatively indicate a variation or average in a physical characteristic of a group.

The nanoparticles in components (i) and (ii) typically have a size within a range of 1-50 nm. In different embodiments, the nanoparticles in components (i) and (ii) independently have a size of precisely or about, for example, 1, 2, 3, 4, 5, 8, 10, 12, 15, 20, 25, 30, 35, 40, 45, or 50 nm, or a size within a range bounded by any two of the foregoing values (e.g., 1-50 nm, 1-40 nm, 1-30 nm, 1-15 nm, 1-10 nm, 1-8 nm, 1-5 nm, or 1-3 nm). As the nanoparticles are typically spherical or quasi-spherical, the term "size" generally refers to the diameter of the nanoparticle. However, in the event the nanoparticle significantly departs from a spherical shape, such as a rod-like, platelet, or pyramidal (or other polyhedral) shape, the term "size" may refer to the dimension of longest length or an average of the three dimensions of the nanoparticle.

The nanoparticles in components (i) and (ii) are encapsulated by a layer of alkylthiol or alkylamine molecules. The metal nanoparticles in components (i) and (ii) are composed substantially or completely of metal atoms in their elemental (zerovalent) states. In typical embodiments, the metal nanoparticle core is composed of metal atoms in the zerovalent state except that the surface of the core may contain metal atoms in a positively-charged state (or oxidized form), such as a $Ag^0$ core having $Ag^+$ ions residing thereon (Ag in the +1 oxidation state), or a $Pd^0$ core having $Pd^{+2}$ ions residing thereon (Pd in the +2 oxidation state). As well known in the art, alkylthiol and alkylamine molecules strongly interact with noble metal surfaces via their thiol (—SH) or amine (—$NH_2$) functionalities, thus directing the alkyl groups outwardly from the nanoparticle surface. The resulting coating is often referred to as a self-assembled monolayer (SAM) or staple motif (D. Jiang et al. *J. Am. Chem. Soc.,* 2008, 130 (9), pp 2777-2779). Notably, although the coating is often a monolayer, for purposes of the present invention, the coating need not be restricted to a monolayer. The use of self-assembled monolayers in nanoparticle synthesis is described in, for example, M. Goren et al., *Langmuir,* 22 (3), 1048-1054, 2006; J. Cookson, *Platinum Metals Rev.,* 56 (2), 83, 2012; A. Kyrychenko et al., *J. Phys. Chem. C,* 116, 39, 2012; and E. Colangelo et al., *Bioconjugate Chemistry,* 28 (1), 11-22, 2017; and U.S. Application Pub. No. 2010/0227189; the contents of which are herein incorporated by reference in their entirety. In one set of embodiments, the alkyl group in the alkylthiol or alkylamine molecule is composed of only carbon and hydrogen atoms, which renders the alkyl group hydrophobic. The hydrophobic alkylthiol or alkylamine molecule can be conveniently represented by the following structures: HS—$(CH_2)_n CH_3$ and $H_2N$—$(CH_2)_n CH_3$, wherein n is typically at least 3 and up to, for example, 11, 12, 13, 14, 15, 16, 17, 18, 19, 20, 21, or 22. In the foregoing structures, one or more hydrogen atoms may or may not be substituted with one or more fluorine atoms. Moreover, in the foregoing structures, one or more hydrogen atoms may be replaced with one or more hydrocarbon groups, thereby resulting in a branched alkyl group. In another set of embodiments, the alkyl group in the alkylthiol or alkylamine contains at least one heteroatom selected from oxygen and nitrogen atoms, wherein the heteroatom either inserts between carbon atoms (e.g., as —O— or —NH—) or between a carbon and hydrogen atom (e.g., as —OH or —$NH_2$) or replaces one or more hydrogen atoms (e.g., as a carbonyl group, C=O). The presence of one or more heteroatoms in the alkyl group renders the alkyl group less hydrophobic, and in some cases, may impart substantial hydrophilicity to the alkyl group. Such hydrophilicity may permit the resulting alkylthiol or alkylamine to solubilize the metal nanoparticle into a more hydrophilic fluid, such as an aqueous-based or alcohol-based hydraulic fluid. For example, in some embodiments, the alkyl group may be or include a polyethylene glycol (PEG) group.

PEGylated gold nanoparticles are described in, for example, K. Rahme et al., *RSC Advances*, 3, 6085-6094, 2013, the contents of which are herein incorporated by reference.

In a first set of embodiments, component (i) includes silver nanoparticles, while gold nanoparticles may be included or excluded. In a second set of embodiments, component (i) includes gold nanoparticles, while silver nanoparticles may be included or excluded. In a third set of embodiments, component (ii) includes palladium nanoparticles, while platinum nanoparticles may be included or excluded. In a fourth set of embodiments, component (ii) includes platinum nanoparticles, while palladium nanoparticles may be included or excluded. Thus, in different embodiments, the following combinations of components (i) and (ii) may be employed: (a) silver and palladium nanoparticles; (b) silver and platinum nanoparticles; (c) gold and palladium nanoparticles; and (d) gold and platinum nanoparticles.

The term "silver nanoparticles" typically indicates nanoparticles whose cores (i.e., metal portion excluding the surrounding encapsulating molecules) are composed entirely of silver. The terms "palladium nanoparticles," "gold nanoparticles," and "platinum nanoparticles" also typically indicates nanoparticles whose cores are composed entirely of palladium, gold, or platinum, respectively. Nevertheless, in other embodiments, the foregoing terms may include the possibility of one or more other metals being present. For example, the term "silver nanoparticle" may include the possibility of nanoparticles containing silver combination with another metal, such as silver and palladium, or silver and gold, or silver and platinum, with silver generally present in an amount of at least or above 30, 40, 50, 60, 70, 80, or 90 wt % or mol %. In the event of component (i) and/or (ii) containing nanoparticles composed of two or more metals, the two or more metals may be present as an alloy or as discrete regions, such as in a core-shell arrangement. Notably, in the event another metal is present, the other metal should not adversely affect the ability of the primary metal (e.g., silver, palladium, gold, or platinum) to reduce friction and wear during operation. If such adverse effect occurs, the other metal should be excluded. In the case of nanoparticles having a core-shell arrangement, the nanoparticles may preferably have the shell composed of silver, gold, palladium, or platinum. Moreover, in the event that nanoparticles of the same composition are used containing a combination of metals selected from components (i) and (ii), such nanoparticles may function as components (i) and (ii), even though the nanoparticles have a single composition. In other embodiments, components (i) and (ii) are required to be present as nanoparticles of different compositions, and the nanoparticles may or may not independently be composed of one or more metals.

The encapsulated nanoparticles in components (i) and (ii) can be obtained commercially or can be synthesized by methods well known in the art. In a typical method, a metal salt (e.g., silver, palladium, gold, and/or platinum salt) is dissolved in a suitable solvent. To the solution of metal salt is added the capping (encapsulating molecules), such as a thiol, amine, or phosphine, and then a reducing agent is added to reduce the ionic metal to elemental form. Some examples of reducing agents include the boranes, hydroxylamine, hydrazine, hypophosphite, citrate, and stannous chloride. Typically, the solvent is then removed, and the crude nanoparticle product is washed with a solvent capable of removing excess capping molecules and byproducts but in which the nanoparticles are insoluble. In some embodiments, the nanoparticles may be further purified by, for example, extraction, precipitation, filtration, dialysis, centrifugation (typically, ultracentrifugation), and/or column chromatography. To produce the lubricant composition, the nanoparticles in components (i) and (ii) are dispersed in an appropriate fluid, i.e., component (iii), by methods well known in the art, such as by simple mixing or other form of agitation.

Component (iii), the fluid, can be any liquid in which components (i) and (ii) are at least partially or fully soluble or suspendable. The fluid should also be suitable as a lubricating medium for metal parts. Typically, the fluid is substantially non-volatile by having a boiling point of at least or above, for example, 100° C., 120° C., 150° C., or 180° C. In some embodiments, solvents containing boiling points below any of the foregoing boiling points are substantially or completely excluded from the fluid. In some embodiments, the fluid is an oil, also referred to herein as a base oil. The base oil can be any of the polar or non-polar base oils known in the art useful as mechanical lubricating oils. As well known in the art, the mechanical lubricating oil can be further classified as, for example, an engine (motor) lubricating oil, industrial lubricating oil, or metal working fluid. The classification, uses, and properties of such oils are well known in the art, as provided, for example, by U.S. Pat. No. 8,268,760, the contents of which are herein incorporated by reference in their entirety. In particular, the base oil may belong to any of the well established five categories of hydrocarbon oils (i.e., Groups I, II, III, IV, or V) classified according to the extent of saturates, sulfur, and viscosity index. The base oil can have any of the typical boiling points, e.g., at least 100, 120, 150, 180, or 200° C. and up to 250, 300, 350, 400, 450, or 500° C. In some embodiments, the base oil is a synthetic oil, such as any of the Groups I-V, and may or may not include polyalphaolefins (PAO). Some other synthetic oils include hydrogenated polyolefins, esters, fluorocarbons, and silicones. In other embodiments, the base oil may be natural, such as a mineral oil, vegetable oil, or animal oil. In yet other embodiments, the base oil may have a substantially high enough viscosity to qualify it as a grease, wherein the grease typically lowers in viscosity during use by virtue of heat generated during use. In other embodiments, the fluid is more hydrophilic than an oil. Generally, the hydrophilic fluid includes at least one functional group selected from ester, ether, carboxylic acid, or hydroxy group. The hydrophilic fluid may be or include, for example, one or more solvents typically used in a hydrophilic hydraulic fluid. Some examples of hydrophilic fluids include water, the alcohols, and phosphate esters. Some particular examples of alcohols include butanol, the alkylene glycols (e.g., ethylene glycol and propylene glycol), and the polyalkylene glycols. Organic solvents, such as acetonitrile, ethanol, n-propanol, isopropanol, DMF, DMSO, and acetone, may be included or excluded from the fluid.

Generally, the polarity (hydrophobicity or hydrophilicity) of nanoparticles in components (i) and (ii) is selected, via appropriate selection of the alkylthiol or alkylamine, to be substantially similar to the polarity of the fluid in order to maximize the interaction between the nanoparticles and fluid. Preferably, the alkylthiol or alkylamine encapsulating molecules are selected in such manner as to render the nanoparticles at least partially, substantially, or fully soluble in the fluid. For example, where the fluid is a hydrophobic oil, such as a hydrocarbon-based oil, the nanoparticles in components (i) and (ii) may be rendered substantially hydrophobic by selecting hydrophobic alkylthiol and/or alkylamine molecules (for example, dodecylthiol or dodecylamine) as the encapsulating molecules for the nanoparticles.

The fluid may or may not also be or include an ionic liquid. As well known in the art, the term "ionic liquid" is an ionic compound that is, itself, a liquid, i.e., without being dissolved in or solvated with a solvent. The ionic liquid is typically a liquid at room temperature (e.g., 15, 18, 20, 22, 25, or 30° C.) or lower. However, in some embodiments, the ionic liquid may become a liquid at a temperature above 30° C. Thus, in some embodiments, the ionic liquid may have a melting point of up to or less than 100, 90, 80, 70, 60, 50, 40, or 30° C. In other embodiments, the ionic liquid is a liquid at or below 10, 5, 0, −10, −20, −30, or −40° C. The ionic liquid compound includes any cationic species (herein identified as $L^+$) and any anionic species $X^-$, that together form an ionic liquid. The cationic species may be, for example, an ammonium or phosphonium species. The ionic liquid compound can be conveniently expressed by the formula $L^+X^-$, wherein $L^+$ is a cationic component of the ionic liquid and $X^-$ is an anionic component of the ionic liquid. The formula $(L^+)(X^-)$ is meant to encompass a cationic component $(L^+)$ having any valency of positive charge, and an anionic component $(X^-)$ having any valency of negative charge, provided that the charge contributions from the cationic portion and anionic portion are counterbalanced in order for charge neutrality to be preserved in the ionic liquid molecule. More specifically, the formula $(L^+)(X^-)$ is meant to encompass the more generic formula $(L^{+a})_y(X^{-b})_x$, wherein the variables a and b are, independently, non-zero integers, and the subscript variables x and y are, independently, non-zero integers, such that $a \cdot y = b \cdot x$ (wherein the period placed between variables indicates multiplication of the variables). The foregoing generic formula encompasses numerous possible sub-formulas, such as, for example, $(L^+)(X^-)$, $(L^{+2})(X^-)_2$, $(L^+)_2(X^{-2})$, $(L^{+2})_2(X^{-2})_2$, $(L^{+3})(X^-)_3$, $(L^+)_3(X^3)$, $(L^{+3})_2(L^{-2})_3$, and $(L^{+2})_3(X^{-3})_2$. Moreover, the ionic liquid may or may not be in admixture with any one or more of the hydrophobic or hydrophilic fluids described above.

The lubricant composition may also include any one or more additional lubricant additives well known in the art. The additional lubricant additive is a compound or material that provides an adjunct or auxiliary effect at low concentrations, typically up to or less than 1, 2, 5, 7, or 10 wt % by weight of the lubricant composition. The additional additive can be, for example, an anti-wear additive (typically metal-containing), extreme pressure additive, metal chelator, ultraviolet stabilizer, radical scavenger, anti-oxidant, corrosion inhibitor, friction modifier, detergent, surfactant, anti-foaming agent, viscosity modifier (viscosity index improver), or anti-foaming agent, or combination thereof, all of which are well known in the art, as further described in U.S. Pat. Nos. 8,455,407 and 8,268,760, both of which are herein incorporated by reference in their entirety.

In some embodiments, the additional lubricant additive is an anti-wear additive, such as a metal-containing dithiophosphate, sulfur-containing fatty acid or ester thereof, dialkyl sulfide, dithiocarbamate, polysulfide, or boric acid ester. In further embodiments, the additional lubricant additive is a metal-containing dialkyldithiophosphate or dialkyldithiocarbamate, wherein the metal is typically zinc or molybdenum, as in zinc dialkyldithiophosphate (ZDDP) or molybdenum dialkyldithiocarbamate (MoDTC), and the alkyl groups typically include between 3 and 12 carbon atoms and can be linear or branched. The anti-wear additive can be included in the lubricating composition in any suitable amount typically used in the art, such as between 1 and 15 wt %. In some embodiments, the anti-wear additive is advantageously used in an amount less than typically used in the art, e.g., in an amount of less than 1 wt %, or up to or less than 0.5 or 0.1 wt %, by virtue of the improved properties provided by components (i) and (ii), described above, or by a synergistic interaction between components (i) and (ii) and the additional anti-wear additive.

In another aspect, the present disclosure is directed to methods for using the above-described lubricant composition for reducing friction and/or wear in a mechanical device for which lubricity is beneficial. The mechanical device may be, for example, a bearing (e.g., a slide bearing, ball bearing, rolling element bearing, or jewel bearing), piston, turbine fan, rotary blade, compressor blade, gear, axle, engine part (e.g., engine valve, piston, cylinder, or transmission), hydraulic system, or metal cutting tool or machine. The parts being lubricated are typically constructed of a metal or metal alloy, which may be or include, for example, steel, iron, aluminum, nickel, titanium, or magnesium, or a composite or alloy thereof. The lubricant composition described above can be applied to a mechanical component by any means known in the art. For example, the component may be immersed in the lubricant composition, or a coating (film) of the lubricant composition may be applied to the component by, e.g., dipping, spraying, painting, or spin-coating.

The lubricant compositions described above reduce wear and/or friction. In some embodiments, the lubricating composition provides a coefficient of friction (i.e., friction coefficient) of up to or less than, for example, 0.5, 0.4, 0.3, 0.2, 0.1, or 0.05, or a reduction in friction by any of the foregoing values or by at least 10, 20, 30, 40, 50, 60, 70, 80, or 90%. In other embodiments, the lubricating composition may or may not have an appreciable effect on friction, but may reduce the wear rate, e.g., by at least or greater than 10, 20, 30, 40, or 50%. In yet other embodiments, the lubricating composition may or may not also improve the corrosion resistance of the treated substrate. The improved corrosion resistance may be evidenced by a resistance to corrosion in air or after treatment in a liquid corrosion test, such as treatment in a salt solution of at least 0.1 M, 0.2 M, 0.5 M, 1.0 M, 1.5 M, or 2.0 M concentration for at least 0.5, 1, 2, 3, 4, 5, 6, 12, 18, 24, 36, or 48 hours. In still other embodiments, the lubricant composition described herein may provide a multiplicity of functions, which can be two or more of, for example, anti-wear, extreme pressure, friction modifier, anti-oxidant, detergent, and anti-corrosion functions.

In some embodiments, the lubricant composition exhibits a synergistic effect between components (i) and (ii) in its ability to improve tribological properties, such as reducing friction and/or wear rate (wear volume). For example, components (i) and (ii), when present together in the lubricant composition, may provide a greater reduction in friction and/or wear rate (wear volume) than the additive reduction in friction and/or wear rate provided by each of components (i) and (ii) individually (i.e., when component (i) or (ii) is in the lubricant composition not in combination). In different embodiments, the lubricant composition may provide at least an additional 10%, 20%, 30%, 40%, 50%, 60%, 70%, 80%, 85%, 90%, or 100% improvement in friction reduction and/or wear rate reduction over the additive reductions in friction and/or wear rate provided by each of components (i) and (ii) individually.

Examples have been set forth below for the purpose of illustration and to describe certain specific embodiments of the invention. However, the scope of this invention is not to be in any way limited by the examples set forth herein.

EXAMPLES

Synthesis of Silver Nanoparticles (Ag NPs) and Palladium Nanoparticles (Pd NPs)

Silver NP Synthesis.

AgNPs were synthesized using a synthetic method similar to that described in C. Kumara et al., *ACS Applied Materials & Interfaces*, 9(42), 37227-37237, 2017, which is incorporated herein by reference. Briefly, $AgNO_3$ (1 mmol/170 mg) was dissolved in acetonitrile (2 mL), mixed with toluene (30 mL), and stirred for 30 minutes at 70° C. Dodecanethiol (2 mmol) was added and stirred for another 30 minutes. Next, tert-butylamine borane (5 mmol/0.435 g) powder was added to the mixture and the reaction was continued for another 2 hours at 70° C. After cooling to room temperature, the solvent was removed by rotary evaporation and washed with ethanol several times to remove excess thiol and other byproducts. Finally, the product was extracted with toluene to isolate the Ag NPs.

Palladium NP Synthesis.

Dodecanethiol-modified palladium (Pd) NPs were synthesized using a synthetic method similar to that described in C. Kumara et al., *ACS AppliedMaterials & Interfaces*, 2018, 10(37), 31804-31812. $PdCl_2$ (2.16 mmol/0.383 mg) was dissolved in acetonitrile (2 mL) and then mixed with a toluene solution (30 mL) and stirred for 30 minutes at 70° C. Then dodecanethiol (1.08 mmol) was added, and the solution was stirred for another 30 minutes. Next, tert-butylamine borane (10.8 mmol/0.939 g) powder was added to the mixture and allowed to react for another 2 hours at 70° C. The solvent was then removed by rotary evaporation and washed with ethanol several times to remove any excess thiol and other by-products. Finally, the product was extracted with toluene to isolate the Pd NPs.

Nanoparticle Characterizations.

UV-visible spectra of the NPs were recorded in toluene using a Varian® Cary 5000 spectrophotometer. TEM samples were prepared by drop-casting a toluene solution of NPs onto lacey carbon films supported on a copper grid, allowing slow solvent evaporation. The grid was stored in vacuum overnight before analysis. Transmission electron microscopy (TEM) images were acquired on a Hitachi® HF-3300 TEM at 300 kV.

Tribological Testing.

Boundary lubrication tests were conducted at 100° C. using a Plint® TE-77 tribometer with an AISI 52100 steel ball (10 mm diameter) reciprocating sliding against a CL35 gray cast iron flat. The steel ball was a standard grade 25 bearing with roughness of ~15 nm (Ra). The surface of the cast iron flat was polished using 240, 400, and then 600 grit SiC abrasive paper to reach a roughness of ~60 nm (Ra). All contact surfaces were cleaned using acetone, isopropyl alcohol, and then toluene before and after each test. Tribological tests were conducted by applying a 100 N normal load at 10 Hz oscillation with a 10 mm stroke length for a sliding distance of 1000 m. The friction force was captured in situ by a piezoelectric load cell and was normalized by the normal load to calculate the friction coefficient. Wear volumes of both ball and flat wear scars were quantified using a Wyko® NT9100 white light interferometer. At least two tests were conducted for each lubricant at each condition, and the averaged friction and wear results are reported here.

Tribofilm Characterization.

The top surfaces of the wear scars and their elemental compositions were analyzed using a Hitachi 4800 scanning electron microscope (SEM) coupled with an EDS detector. On a selected area of the wear scar of the cast iron flat surface, a carbon layer followed by a tungsten layer was deposited to protect the tribofilm from the focused ion beam (FIB) process. Then, thin cross-sections of the wear scar near to the surface were lifted out using a Hitachi NB5000 SEM/FIB equipped with a gallium ion source. The nanostructure of the FIB-lifted cross-section near the contact surface was examined by a Hitachi® HF-3300 STEM coupled with a Bruker® solid state EDS detector. The relative chemical composition was determined using the standardless routine in the Bruker® Esprit software. A K-Alpha X-ray photoelectron spectroscope was used to analyze the chemical composition of the tribofilm qualitatively and quantitatively. X-rays were generated from the monochromatic Al-K$\alpha$ source, and the emitted photoelectrons were analyzed with a hemispherical energy analyzer. Ion sputtering was performed using argon ions for 15 seconds to remove any surface contamination. The relative elemental composition was determined by measuring the peak areas of the primary core levels of the elements present normalized with tabulated sensitivity factors. Composition-depth profiles were acquired by argon-ion sputtering, by removing the tribofilm, layer by layer.

Results and Discussion

Figures 1B, 1C:
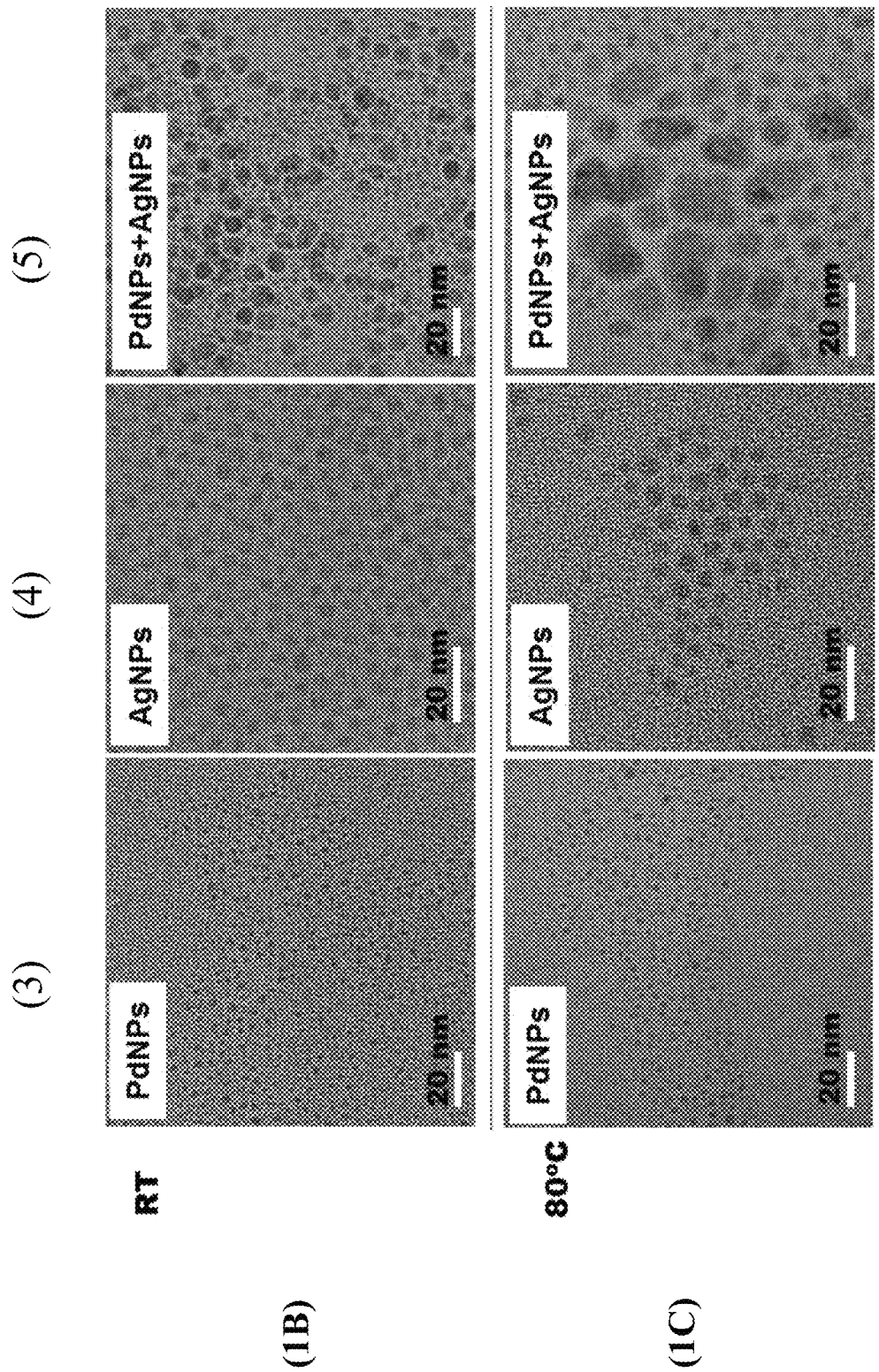

The behavior of the NP mixture was studied by mixing the Ag and Pd NPs in a toluene solution (1:1 weight ratio) at both room temperature (RT) and 80° C. Initial characterization was done using UV-visible spectroscopy. The Ag NPs alone exhibited a broad band centered at around 450 nm due to surface plasmonic resonance (SPR), which is a collective oscillation of the valance band free electron in response to the incident radiation. In contrast, the Pd NPs alone showed a featureless spectrum in the UV-visible range. Optical spectra of the NP mixture were monitored over time at room temperature, as shown in FIG. 1A (panel 1). The SPR peak of the Ag NPs gradually became broader and blue-shifted after mixing with the Pd NPs. The peak shifting, and broadening indicated modification of the electronic structure of the SPR of the Ag NPs, possibly by Pd atom doping. The SPR peak eventually dampened and blue-shifted from 452 to 425 nm after 8 days. The size distribution of the as-synthesized Ag and Pd NPs are 3-6 nm and 2-4 nm, respectively. Upon mixing and after 8 days of storage, the NPs evolved to be relatively large particles of up to 10 nm and the shape became quasi-spherical, as shown in the transmission electron microscopy (TEM) images in FIG. 1B. The evolutions in both the optical spectrum and particle morphology indicate interactions between the Ag and Pd NPs.

The NP mixture was further studied by heating another sample of freshly mixed Ag and Pd NPs in toluene at 80° C. and holding the temperature for 30 minutes. As shown in the optical spectra in FIG. 1A (panel 2), heating evidently caused faster interactions between the Ag and Pd NPs, as reflected by more significantly blue-shifting (to 402 nm) and broadening of the Ag NPs' plasmonic band, compared with the SPR at RT after 8 days. Interestingly, the SPR peak of the Ag NPs alone was blue-shifted (452 to 422 nm) and narrowed with the heat treatment as shown in FIG. 1A (panel 2) and this shift can be attributed to the heat-induced Ag NPs' aggregation/size increase. As shown in the TEM images in FIG. 1C, the size change of the Pd NPs appeared to be insignificant after heating. Similar to being stored at RT for 8 days, some large NPs in quasi-spherical shape (up to ~20 nm) appeared in the Ag—Pd NPs' mixture after the 30-minute heating. The quasi-spherical shapes and broad size distribution of the NPs in the heat-treated mixture may be due to several causes. One cause may be Inter-NP atom diffusion. Having similar atomic radii and crystal lattices, Ag and Pd may form a solid solution. The plasmonic peak shifting and particle size and shape changes are likely due to diffusion between the Ag and Pd NPs. Another cause may be a galvanic replacement reaction (GRR). Silver NPs typically contain Ag (0) in the metallic core and Ag (+1) at the interface in staple motif. Similarly, Pd NPs generally have a metallic Pd core and the oxidized form (2+) at the interface. The difference in the standard reduction potentials (Pd=0.987 eV and Ag=0.799 eV) may lead to a redox reaction. The Pd in the NP outer-shell ($Pd^{2+}$) may be reduced to the metallic form ($Pd^0$) by oxidizing the metallic Ag in the core. This galvanic reaction was further evidenced by X-ray photoelectron spectroscopy (XPS) analysis.

The two metallic nanoparticles (Ag NPs and Pd NPs) were mixed into a PAO base oil to test their lubricating properties. Silver and Pd NPs have been previously reported as effective lubricant additives when used alone (e.g., C. Kumara et al., 2017, supra). While the Pd NPs alone remained stably suspended in the PAO base oil for more than 6 months, the Ag NPs alone would start to precipitate after 2-3 months in the oil, perhaps because of impact of visible light. In contrast, the combination of Ag NPs and Pd NPs appeared to form a kinetically stable colloidal suspension in the oil which remained for many months without observable precipitation or color change.

Figure 2A:
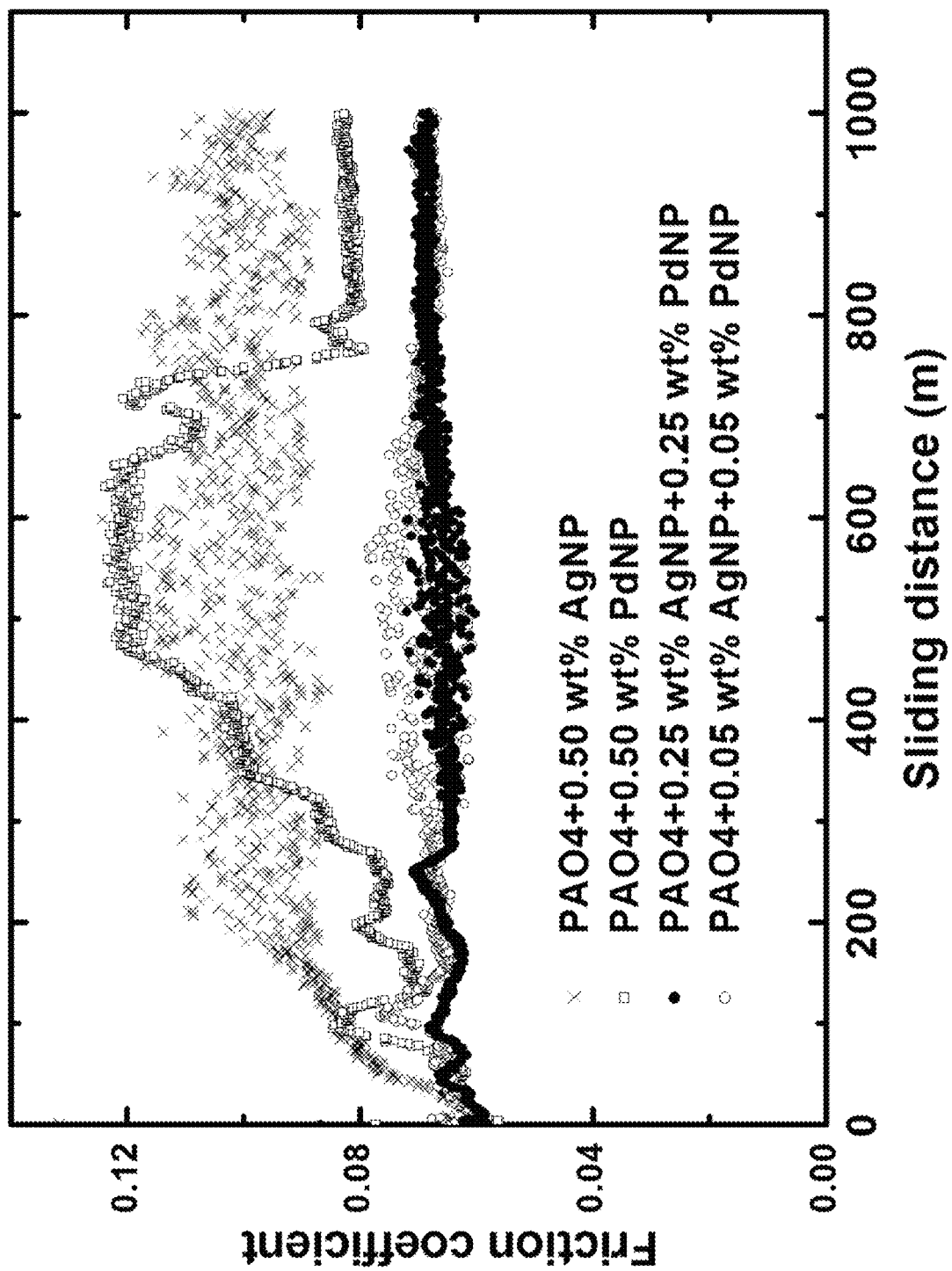
FIGS. 2A and 2B are plots of friction coefficients and wear volumes for Ag NPs and Pd NPs and combinations thereof in a base oil (PAO).
Figure 2B:
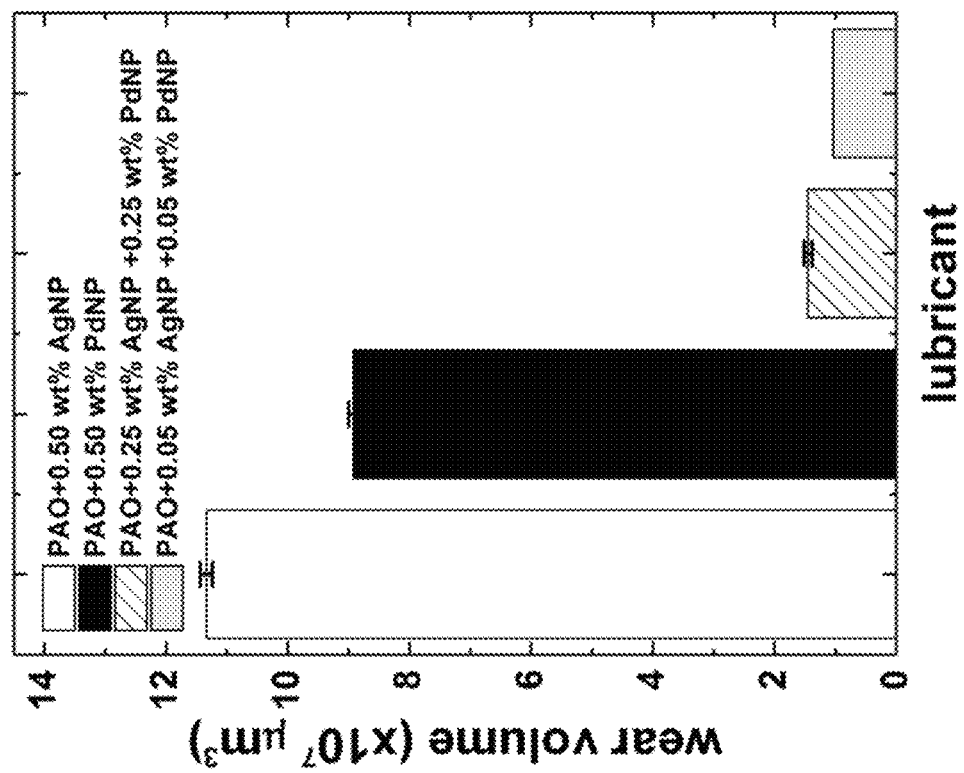

FIGS. 2A and 2B show the friction and wear results for the three experimental lubricating compositions containing 0.5% AgNP, 0.5% PdNP, and 0.25% AgNP+0.25% PdNP, respectively. Although all three compositions had very similar initial coefficients of friction (COF) of around 0.06, the COFs of the two compositions containing either the Ag NPs or Pd NPs alone climbed during running-in to and then fluctuated around 0.09-0.11 and 0.08-0.12, respectively. In contrast, the oil containing both the Ag NPs and Pd NPs showed fairly stable friction behavior with a COF in a narrow range of 0.06-0.07 for the entire 1000 m of sliding. The Ag+Pd NP combination reduced friction by 30-40% and by 20-50% compared with the Ag NPs and Pd NPs alone, respectively.

Furthermore, adding the Ag NPs and Pd NPs together into the PAO base oil reduced the wear volume by two orders of magnitude, which was an additional 80% improvement over using either the Ag or Pd NPs alone (see the bar chart in FIG. 2B). Increasing the concentration of either the Ag NPs or Pd NPs alone up to 1 wt % improved the wear protection but could not match the performance of the 0.25% AgNP+ 0.25% PdNP. Such a synergistic effect was further confirmed by testing the AgPd NPs at a 5-times lower concentration. As shown in FIGS. 2A and 2B, the PAO+0.05% AgNP+0.05% PdNP (total NP concentration of 0.1%) surprisingly outperformed the oil containing the Ag NPs or Pd NPs alone at 0.5% concentration in terms of both friction reduction and wear protection.

Two types of tribofilms have been reported on the worn ferrous surfaces lubricated by the NP-containing lubricants. Type I tribofilm was formed by tribochemical interactions between the organic-modified NPs and the metallic contact surface. The surface-grown tribofilm by NPs has a similar formation mechanism to organic lubricant additives but also had NPs embedded by mechanical mixing. A Type I tribofilm usually has a thickness of tens to hundreds of nanometers and possesses an amorphous matrix reinforced by dispersion of NPs, individually or in small clusters. As known, the matrix composition often is dominated by iron oxides and other iron compounds depending on the organic ligands on the NPs. Alternatively, a Type II tribofilm is formed by agglomeration and deposition of the NPs, as commonly observed for ceramic or carbon NPs. In a recent study (C. Kumara et al., 2018, supra), metallic Pd NPs were found to preferably fill into the valleys on the contact area and could grow to a couple of micrometers thick. In such a scenario, a significant amount of NPs have to be attracted onto the contact area, aggregate upon thermomechanical stresses, and then deposit into surface valleys.

Figure 3A:
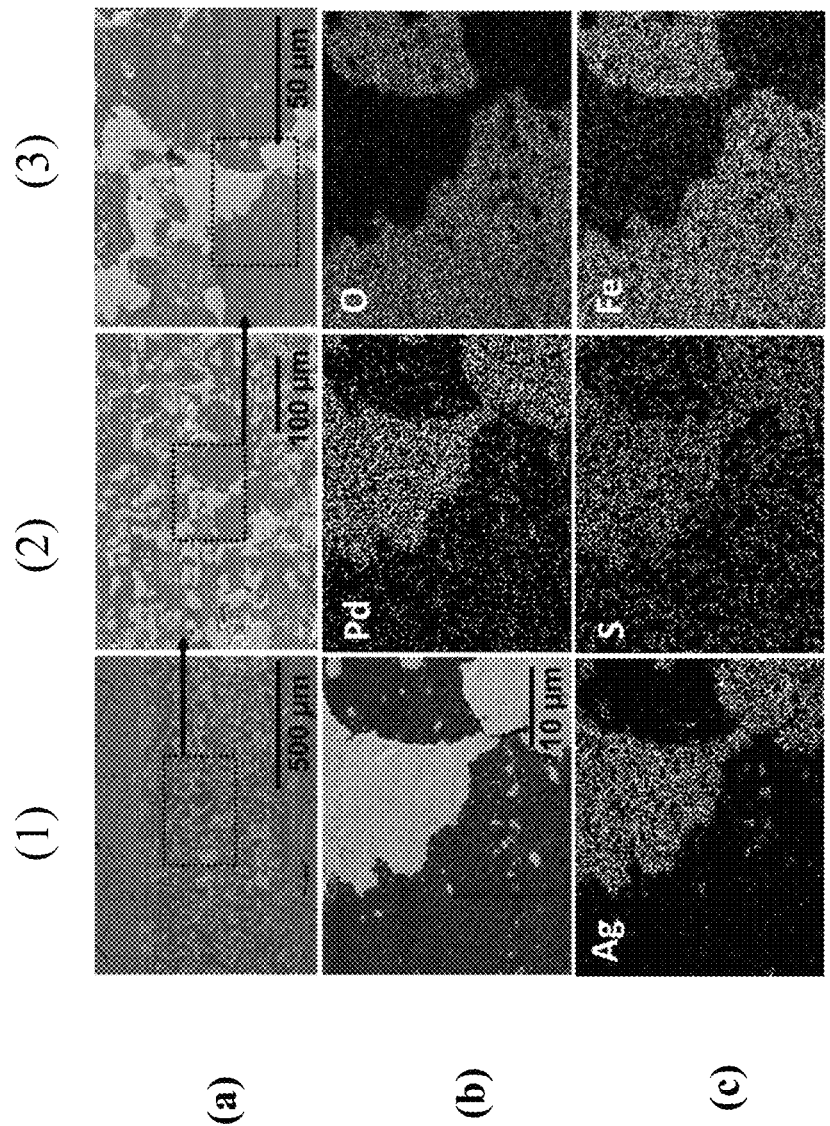
FIG. 3A consists of panels (1a)-(1c), (2a)-(2c), and (3a)-(3c), wherein panels (1a), (2a), (3a), and (1b) are STEM images (at successively increasing magnification, respectively) of wear scars on gray cast iron flat lubricated with PAO (base oil) containing 0.25% Ag NPs and 0.25% Pd NPs as additives, and panels (2b), (3b), and (1c)-(3c) are EDS elemental maps (Pd, O, Ag, S, and Fe, respectively) of the wear scar at the highest magnification.
Figure 3B:
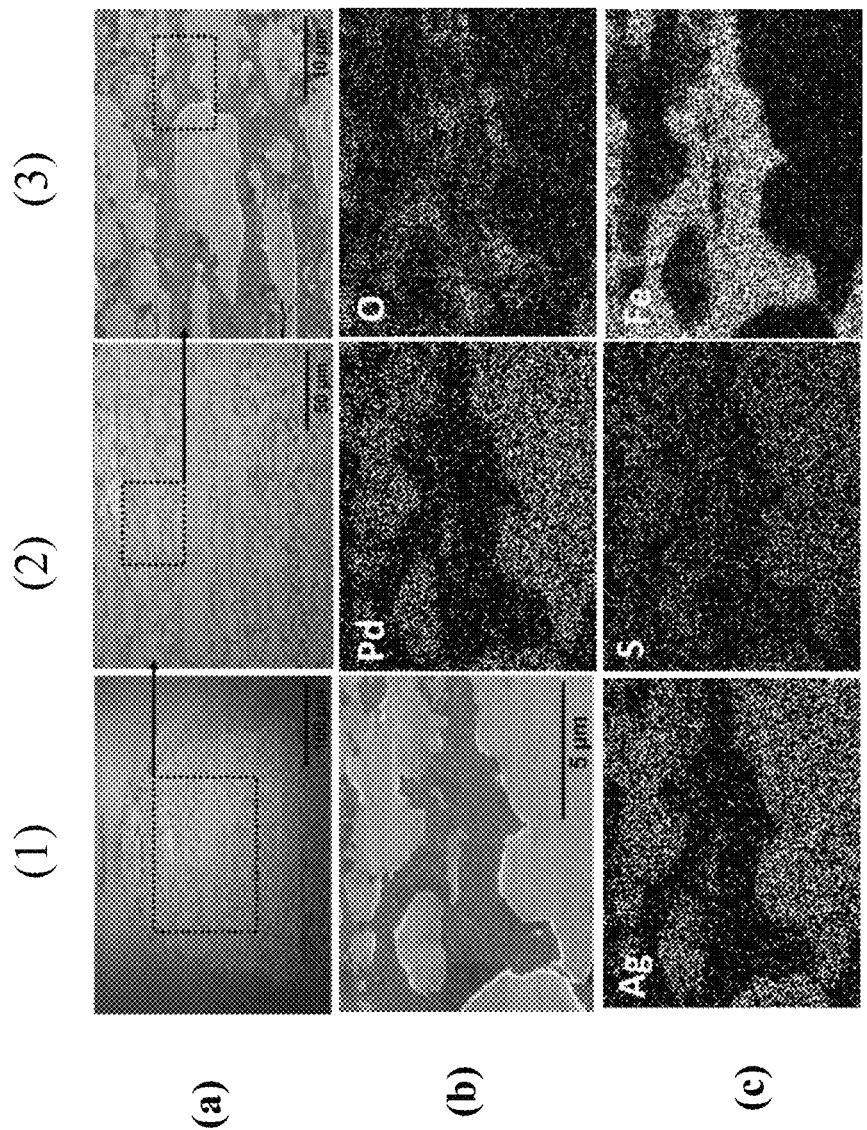
FIG. 3B consists of panels (1a)-(1c), (2a)-(2c), and (3a)-(3c), wherein panels (1a), (2a), (3a), and (1b) are STEM images (at increasing magnification, respectively) of wear scars on AISI 52100 steel ball lubricated with PAO (base oil) containing 0.25% Ag NPs and 0.25% Pd NPs as additives, and panels (2b), (3b), and (1c)-(3c) are EDS elemental maps (Pd, O, Ag, S, and Fe, respectively) of the wear scar at the highest magnification.

The tribofilm formed using the Ag—Pd NP combination is believed to involve both mechanisms: the organic ligands tribo-chemically react with the iron surface to form a thin tribofilm to cover the plateaus (Type I) and the metallic NP cores agglomerate to fill the valleys (Type II). As a result, the surface remained smooth, and thus, the friction coefficient was kept low, and the combination of the two types of tribofilms provided complementary wear protection. Worn surfaces of both the ball and flat after the tribo-test were first examined using scanning electron microscopy (SEM) and energy-dispersive X-ray spectroscopy (EDS). The SEM images and EDS elemental maps in FIG. 3A indicate a deposition film containing Pd (dominant), Ag, and S, on the worn cast iron flat lubricated by PAO+0.25% AgNP+0.25% PdNP. A similar deposition film was found on the steel ball worn surface too, as illustrated in FIG. 3B.

Figure 4A:
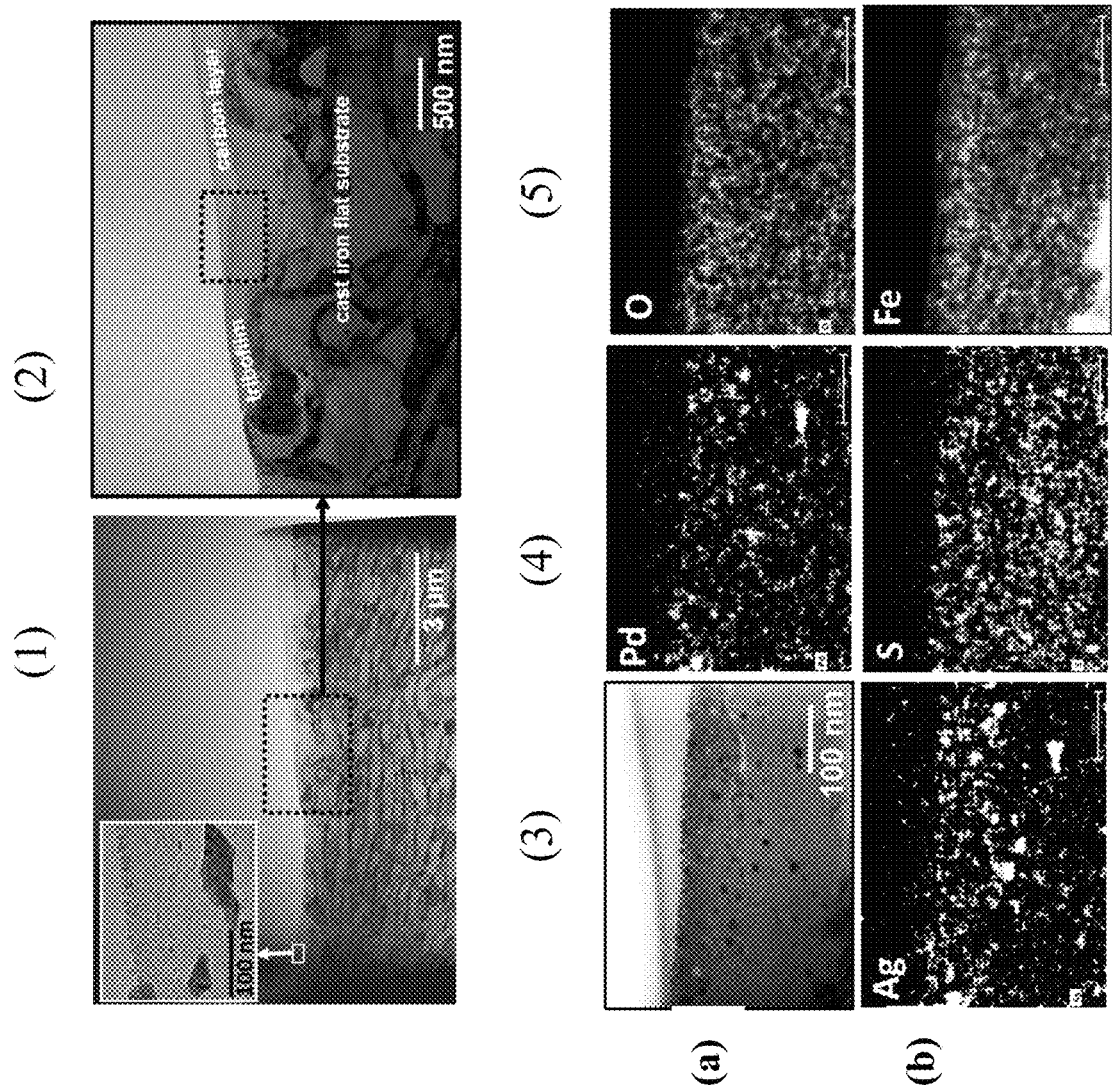
FIG. 4A consists of panels (1), (2), (3a), (3b), (4a), (4b), (5a), and (5b), wherein panels (1), (2), and (3a) are STEM images (at successively increasing magnification, respectively) of a cross-section of a thin tribofilm formed on a cast iron flat lubricated with PAO containing 0.25% Ag NPs and 0.25% Pd NPs as additives, and panels (4a), (5a), and (3b)-(5b) are EDS elemental maps (Pd, O, Ag, S, and Fe, respectively) of the cross-section of the tribofilm at the highest magnification.
Figure 4B:
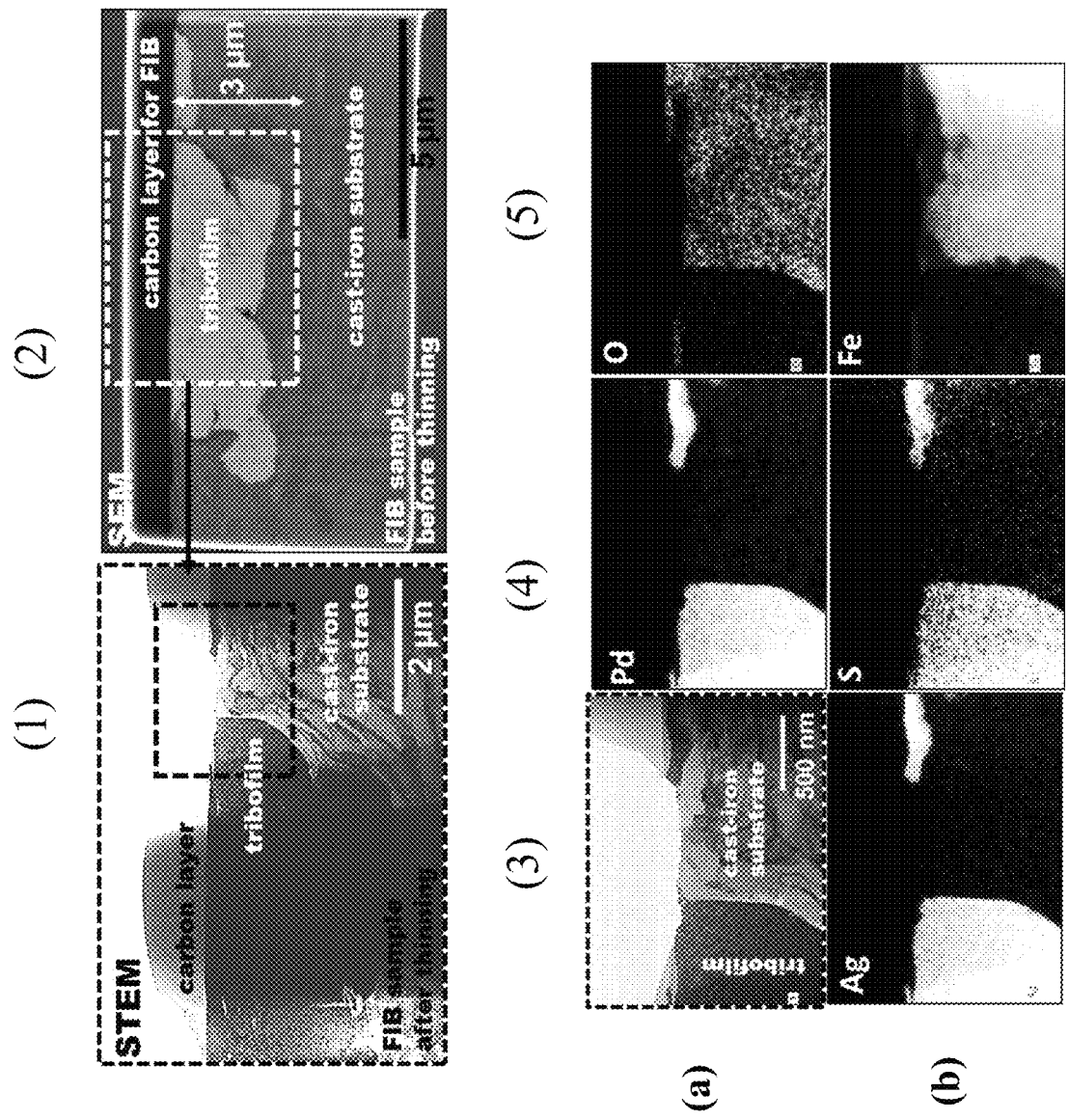
FIG. 4B consists of panels (1), (2), (3a), (3b), (4a), (4b), (5a), and (5b), wherein panel (1) is a STEM image of the cross-section of the thick tribofilm formed on a cast iron flat lubricated with PAO containing 0.25% Ag NPs and 0.25% Pd NPs as additives, after thinning; panel (2) is a SEM image of the cross-section of the tribofilm, before thinning; panel (3a) is a magnified portion of the boxed portion shown in panel (1); and panels (4a), (5a), and (3b)-(5b) are EDS elemental maps (Pd, O, Ag, S, and Fe, respectively) of the cross-section of the tribofilm at the highest magnification

In addition to the top surface analysis, FIB-aided cross-sectional STEM examination provided further insights of the tribofilm thickness, coverage, microstructure, and composition. Some of the results are shown in FIG. 4A. A 50-300 nm thick tribofilm can be seen on this selected surface area on the cast-iron flat wear scar. Ag NPs and Pd NPs appear to be blended with an iron oxide-based tribofilm like the Type 1 tribofilm discussed above. In other locations of the tribofilm, granular-like Ag NP and Pd NP agglomerates in the size of 100-300 nm were found. A Type II tribofilm was found on the cast iron surface lubricated by PAO+0.5% AgNP+0.5% PdNP, as shown in FIG. 4B (appears bright in the SEM image, but dark in the STEM images). This Type II tribofilm evidently filled, healed, and protected a 'huge' valley (possibly ~2.5 µm deep and over an area of ~15 $µm^2$) created during the rubbing process. EDS analysis clearly shows that the major elements of the Type II tribofilm are Pd and Ag along with some sulfur, unlike the Type I tribofilm composed primarily of iron oxides (see FIG. 4A). No phase separation, preferential single NP aggregations, or clear boundaries between aggregations were observed from the elemental maps. The strong interaction between Ag NPs and Pd NPs seemed to result in co-distribution throughout both the Type I and Type II tribofilms.

Three types of interactions are proposed between the Ag NPs and Pd NPs at the lubrication interface: (1) the frictional heating and contact pressure at the contact interface may smear the Pd NPs and the exposed Pd NP cores (high catalytic activity) could cleave the C—S bonds of the Ag NPs; (2) the Pd and Ag NPs may form an AgPd alloy by intermetallic bonds; and (3) GRR between Ag and Pd NPs may be accelerated under the tribomechanical stresses.

Figure 5A:
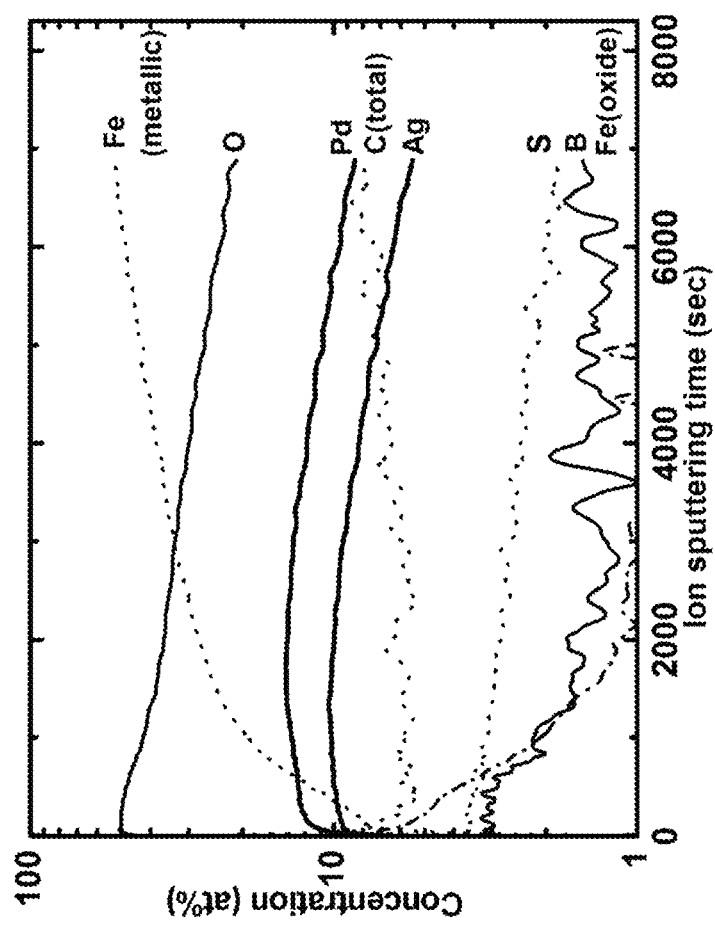
FIG. 5A shows the XPS composition depth profile in the wear track (tribofilm) formed on the worn cast iron flat surface.
Figures 5B, 5C, 5D:
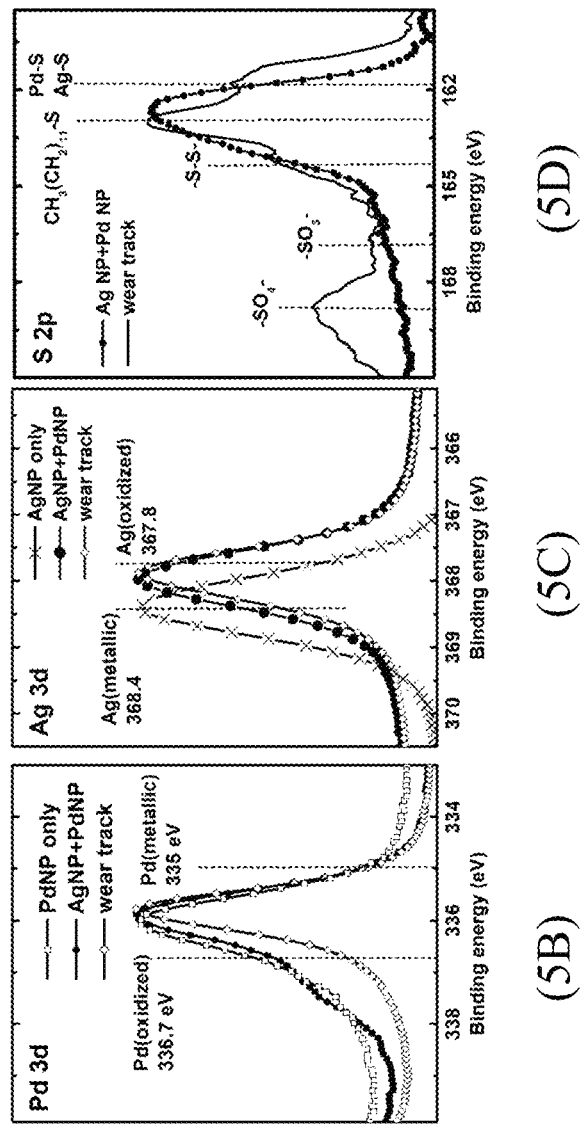
FIGS. 5B-5D show core-level XPS spectra of the major elements present in the Ag NPs, Pd NPs, NP mixture, and in the wear track at Pd 3d, Ag 3d, and S 2p XPS binding energies, respectively.

An XPS survey scan was also made for a mixture of the Ag+Pd NPs compared with that of the worn iron surface lubricated by PAO+0.25% AgNP+0.25% PdNP. The XPS data further confirmed the presence of Ag, Pd, and S on the wear track. The XPS composition-depth profile of the wear track is shown in FIG. 5A (concentration in log scale). The gradual decrease in Pd, Ag, O, and S contents and increase in Fe and C are due to the increased exposure of the substrate along with the ion sputtering time. FIGS. 5B-5D show the XPS core level spectra of the Pd, Ag, and S major elements present in the wear track compared with those of the NPs.

The wear track spectra present here are after 15 seconds of argon-iron sputtering to remove any surface contamination. The XPS spectra of the as-synthesized Ag and Pd NPs (before mixing) were compared with the NP blend in toluene (after mixing). From this, there was observed a shift from an oxidized state to the metallic state for the Pd NPs, whereas the Ag NPs shifted from a metallic to an oxidized state. This shift was likely due to the GRR between the Ag NPs and the Pd NPs, as discussed earlier. Unlike that of the NP blend, the S 2p spectra of the wear track are more resolved into distinct peaks while shifting to the lower binding energy. A portion of the sulfur in the worn surface was present in oxidized form (166-170 eV), corresponding to sulfonate and sulfate. The XPS analysis suggests the presence of a thin interlayer (a PdS shell) between the thiolated outer layer and the PdNP core surface. The thiolated group (BE 162.8) and disulfide (BE 164.3) shifted slightly to the lower energy in the wear track and the metal sulfide ($\Delta BE=0.6$ eV) bonding had a significant down-shift, suggesting significant Pd—S or Ag—S involvement in the tribofilm.

Based on the above material characterization, the synergistic effects between the Ag and Pd NPs on the tribological properties may be explained as follows: (i) Pd NPs catalyze the AgS—R bond breaking to produce an AgPd alloy, which acts as an electron donor for the positively charged metal surface and is actively involved in tribofilm formation; and (ii) the AgPd NPs facilitated formations of two types of tribofilms to provide enhanced surface protection.

CONCLUSIONS

In conclusion, dodecanethiol modified Ag and Pd NPs were synthesized and blended and used as candidate lubricant additives. The sizes of the synthesized Ag and Pd NPs ranged from 3 to 6 nm and from 2 to 4 nm, respectively. A mixture of the two NPs showed quasi-spherical shapes with polydisperse size distribution. Both the individual NPs and their blend formed stable suspensions in a PAO base oil. The combination of Ag NPs and Pd NPs, when used as oil additives, demonstrated synergism in lubricating performance. Top-surface SEM and cross-sectional STEM examination along with EDS analysis revealed formation of two types of protective tribofilms on the worn surface: a classic tribo-chemically reacted thin tribofilm (tens to hundreds of nm) covering the plateaus and a deposited ultra-thick tribofilm (up to 3 µm) filling the deep valleys, which is thought to be responsible for the superior friction and wear behavior. XPS chemical analysis further uncovered the interactions between Ag NPs and Pd NPs and between the NPs and the contact surface. Several mechanisms are herein proposed for the synergism between the Ag NPs and Pd NPs, as discussed above. The electron donation ability of the AgPd combination and dual tribofilm formation are believed to contribute to the enhanced tribological properties.

While there have been shown and described what are at present considered the preferred embodiments of the invention, those skilled in the art may make various changes and modifications which remain within the scope of the invention defined by the appended claims.

What is claimed is:

1. A lubricant composition comprising:
   (i) silver or gold nanoparticles, each of which is encapsulated by a layer of alkylthiol or alkylamine molecules;
   (ii) palladium or platinum nanoparticles, each of which is encapsulated by a layer of alkylthiol or alkylamine molecules; and
   (iii) a fluid in which components (i) and (ii) are present; wherein said alkylthiol has the formula $HS-(CH_2)_nCH_3$ and said alkylamine has the formula $H_2N-(CH_2)_nCH_3$, wherein n is at least 3 and up to 22.

2. The lubricant composition of claim 1, wherein said fluid is a base oil.

3. The lubricant composition of claim 2, wherein said base oil is a mechanical lubricating oil.

4. The lubricant composition of claim 1, wherein components (i) and (ii) are present in said fluid in a total amount of 0.1- 2 wt %.

5. The lubricant composition of claim 1, wherein components (i) and (ii) are present in said fluid in a total amount of 0.1-1 wt %.

6. The lubricant composition of claim 1, wherein component (ii) comprises palladium nanoparticles encapsulated by a layer of said alkylthiol or alkylamine molecules.

7. The lubricant composition of claim 1, wherein nanoparticles in components (i) and (ii) are encapsulated by a layer of said alkylthiol molecules.

8. The lubricant composition of claim 1, wherein nanoparticles in components (i) and (ii) independently have a size within a range of 1-50 nm.

9. The lubricant composition of claim 1, wherein nanoparticles in components (i) and (ii) independently have a size within a range of 1-20 nm.

10. The lubricant composition of claim 1, wherein nanoparticles in components (i) and (ii) independently have a size within a range of 1-10 nm.

11. The lubricant composition of claim 1, wherein components (i) and (ii) are present in a weight ratio of 5:1 to 1:5.

12. The lubricant composition of claim 1, wherein components (i) and (ii) are present in a weight ratio of 2:1 to 1:2.

13. The lubricant composition of claim 1, wherein components (i) and (ii) are present in a weight ratio of about 1:1.

14. A method for reducing friction and wear in metal-containing mechanical components designed for movable contacting interaction with each other, the method comprising coating a lubricant composition on the mechanical components to result in reduced friction and wear when said mechanical components are in movable contacting operation, wherein said lubricant composition comprises:
   (i) silver or gold nanoparticles, each of which is encapsulated by a layer of alkylthiol or alkylamine molecules;
   (ii) palladium or platinum nanoparticles, each of which is encapsulated by a layer of alkylthiol or alkylamine molecules; and
   (iii) a fluid in which components (i) and (ii) are present; wherein said alkylthiol has the formula $HS-(CH_2)_nCH_3$ and said alkylamine has the formula $H_2N-(CH_2)_nCH_3$, wherein n is at least 3 and up to 22.

15. The method of claim 14, wherein said fluid is a base oil.

16. The method of claim 15, wherein said base oil is a mechanical lubricating oil.

17. The method of claim 14, wherein components (i) and (ii) are present in said fluid in a total amount of 0.1- 2 wt %.

18. The method of claim 14, wherein components (i) and (ii) are present in said fluid in a total amount of 0.1- 1 wt %.

19. The method of claim 14, wherein component (ii) comprises palladium nanoparticles encapsulated by a layer of said alkylthiol or alkylamine molecules.

20. The method of claim 14, wherein nanoparticles in components (i) and (ii) are encapsulated by a layer of said alkylthiol molecules.

21. The method of claim 14, wherein nanoparticles in components (i) and (ii) independently have a size within a range of 1-50 nm.

22. The method of claim 14, wherein nanoparticles in components (i) and (ii) independently have a size within a range of 1-20 nm.

23. The method of claim 14, wherein nanoparticles in components (i) and (ii) independently have a size within a range of 1-10 nm.

24. The method of claim 14, wherein components (i) and (ii) are present in a weight ratio of 5:1 to 1:5.

25. The method of claim 14, wherein components (i) and (ii) are present in a weight ratio of 2:1 to 1:2.

26. The method of claim 14, wherein components (i) and (ii) are present in a weight ratio of about 1:1.

27. The lubricant composition of claim 1, wherein component (i) comprises silver nanoparticles encapsulated by a layer of said alkylthiol or alkylamine molecules.

28. The method of claim 14, wherein component (i) comprises silver nanoparticles encapsulated by a layer of said alkylthiol or alkylamine molecules.

\* \* \* \* \*